Jan. 17, 1961 W. ZEITZ ET AL 2,968,544
METHOD AND MEANS FOR DISSOLVING CRUDE PHOSPHATES WITH ACIDS
Filed July 12, 1956 3 Sheets-Sheet 1

WILLI ZEITZ
HUGO NEES
*INVENTORS*

BY *Mason, Porter, Miller & Stewart*

*ATTORNEYS*

WILLI ZEITZ
HUGO NEES
*INVENTORS*

2,968,544

METHOD AND MEANS FOR DISSOLVING CRUDE PHOSPHATES WITH ACIDS

Willi Zeitz, Koln-Deutz, and Hugo Nees, Koln-Bruck, Germany, assignors to Chemische Fabrik Kalk, G.m.b.H., Cologne-Kalk, Germany Filed July 12, 1956, Ser. No. 597,553

Claims priority, application Germany July 19, 1955

10 Claims. (Cl. 71—37)

The invention relates to a method of dissolving crude phosphates, in particular uncalcined crude phosphates, with nitric acid alone or together with sulphuric acid and/or phosphoric acid in several stirrer vessels arranged in series and through which the dissolving mix flows, these vessels being interconnected by reflux conduits through which a portion of the mix is fed back to the first and/or second vessel of the series, the nitric acid and, if used, the sulphuric acid or/and the phosphoric acid being introduced into these reflux conduits between the last or one of the preceding vessels and the first and/or the second vessel, whereas the crude phosphate is introduced into the first vessel or into the first and second vessels. The sulphuric acid and/or the phosphoric acid can, however, be fed to the first or to the first and second vessels either alone or mixed with crude phosphate. In this way it is possible to reduce the loss of nitrogen to 0.2 to 0.5% of the total quantity of nitric acid used.

A further improvement of this method can be attained by suppressing the foam formation which occurs when treating uncalcined crude phosphates with mineral acids, employing suitable measures such as using high speed stirring devices—preferably in the first vessel or in the first and second vessels—using foam centrifuges, installations such as reflecting blades or other means.

Experience has shown that as regards the suppression of the foam, a limit of capacity (kilograms of crude phosphate per hour) is very soon reached, beyond which limit the foam formation can no longer be controlled.

It was unexpectedly discovered that the foam formation can be suppressed beyond this limit of capacity and consequently the quantity of crude materials treated in a given unit of time can be increased threefold if the liquid contents of the first vessel or of the first and second vessels are kept in continuous circulation flowing from the bottom to the top in the central zone of the vessel and from the top to the bottom in the zone near the wall of the vessel. By this measure the foam formation is so effectively suppressed that, in spite of the increased feed of crude material into the dissolving apparatus, it is no longer necessary to use foam centrifuges at first. Moreover thorough mixing is obtained accompanied by a reduction of power requirements.

By the process according to the invention, the quantity of crude phosphate treated per hour can, for example, be increased from about 4 tons, obtained with the ordinary continuous circulation of the liquid contents of the first vessel or of the first and second vessels from the top towards the bottom in the middle of the vessel and from the bottom to the top around the wall thereof, to about 12 tons by reversing the direction of circulation so that the liquid contents of the first vessel or of the first and second vessels flow from the bottom towards the top in the middle zone of the vessel and from the top to the bottom near the wall thereof.

In the process according to the invention, in the event of the crude phosphate and the acid—either alone or diluted with reflux solution—being fed into the contents of the container or vessel without special measures being taken to prevent foam formation, there is a danger of pockets of undissolved acid and undissolved crude phosphates forming in the liquid contents of the vessel and thereby increasing the loss of nitrogen. Consequently it has been found advantageous to feed the crude phosphate alone or mixed with reflux solution and also the fresh acid alone or diluted with reflux solution on to as many points as possible of the surface of the liquid in the first vessel or the first and second vessels.

The crude phosphate, either alone or mixed with reflux solution, and the fresh acid, either alone or diluted with reflux solution, can also be fed to the downward flow at as many places as possible below the surface of the liquid in the first vessel or in the first and second vessels.

Beneficial results can also be obtained by feeding the crude phosphate, either alone or mixed with reflux solution, as well as the fresh acid, either alone or diluted with reflux solution, at two places which are as far apart as possible on to the surface or below the surface of the liquid in the first vessel or in the first and second vessels.

The upward current of liquid is preferably separated from the downward current by a guide or flue tube and flow of liquid is produced by a high speed agitator in the flue tube rotating so that the liquid within the tube flows from the bottom to the top whereas outside the tube it flows from the top to the bottom of the vessel.

Instead of using a high speed agitator surrounded by a guide or flue tube, a stirring cone or rotary spray can be used. If rotary sprays are used, it is advisable to arrange them so that the space of the vessel above the level of the liquid is flushed with liquid.

In the event of the speed of flow in the lower third or fifth of the first and possibly also the second vessel not being sufficiently high with the result that imperfectly dissolved crude phosphate can settle on the bottom of the vessel, it has been found advisable to provide the vessel with a conical bottom sloping downwards towards the centre of the vessel.

Several forms of construction of apparatus for carrying out the process according to the invention are illustrated by way of example in the accompanying drawings, in which.

Figure 1:
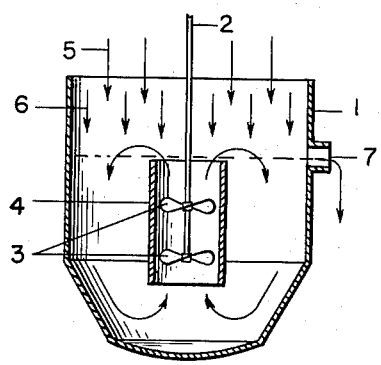
Fig. 1 shows diagrammatically one form of mixing vessel and stirrer suitable for use in the series of interconnected stirrer vessels.

In the vessel 1 of Fig. 1 there is a guide or flue tube 4 in which a high speed agitator rotates which consists of two propellers 3 mounted on a shaft 2 and rotating therewith. The acid is introduced into the vessel at 5 preferably at a number of points above the surface of the liquid in the vessel 1. The crude phosphate is delivered on to the surface of the liquid at a number of points as indicated by the short arrows 6. The solution or mix passes out from the vessel 1 through an overflow 7. The curved arrows indicate the direction of flow of the liquid in the vessel. It will be seen from the drawing that both the acid and the crude phosphate are delivered on to the surface of the liquid.

Figure 2:
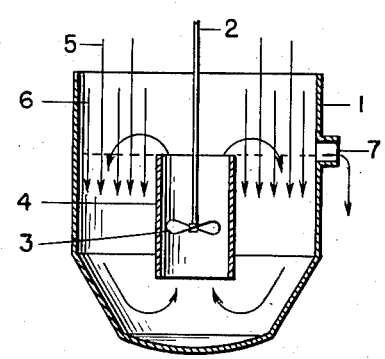
Figs. 2 and 3 show a slightly modified form.

In the vessel, also designated by 1 in Fig. 2, only a single propeller 3 is mounted on the shaft 2 and rotates therewith in the guide or flue tube 4. The crude phosphate is in this case fed below the surface 8 of the liquid at a number of points as indicated by the long straight arrows 6. The acid is likewise preferably fed at several points below the level of the liquid.

Figure 3:
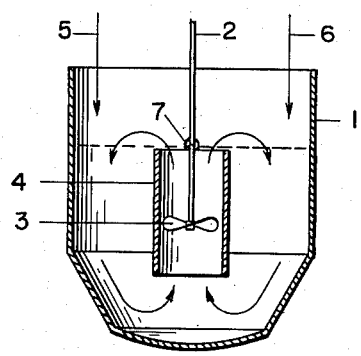

According to Fig. 3, the apparatus of which corresponds to that of Fig. 2, the acid and crude phosphate are fed on to the surface of the liquid at two points situated as far apart as possible. The acid and crude phosphate can also be fed at spacially separated points below the surface of the liquid.

Figure 4:
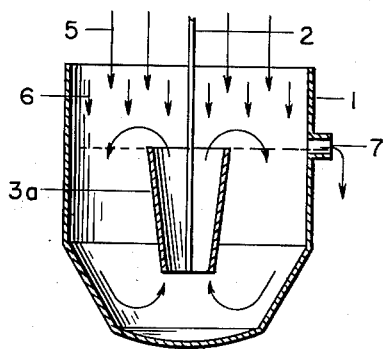
Fig. 4 shows a modified construction for the first two vessels of the series containing a hollow conical stirring tube.

A hollow stirring cone 3a mounted on a shaft 2 and rotating therewith, is arranged in the vessel 1 of Fig. 4. The feed of the acid into the vessel is indicated by the long straight arrows 5 and preferably takes place at a number of points on to the surface of the liquid in the vessel 1. The feed of the crude phosphate which is indicated by the short straight arrows 6, takes place at a large number of points distributed above the vessel. The reaction mix leaves the vessel 1 through the overflow 7. The curved arrows indicate the direction of flow of the liquid in the vessel. As can be seen from the drawing, both the acid and also the crude phosphate are delivered on to the surface of the liquid.

Figure 5:
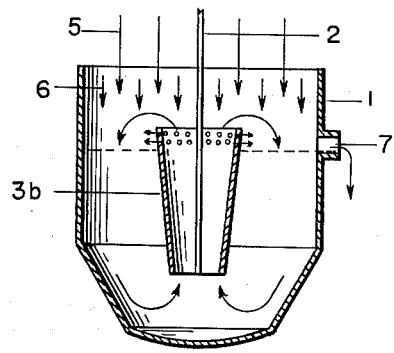
Fig. 5 shows the same adapted for producing a spray.

In the vessel, which is also designated by 1 in Fig. 5, a rotary spray 3b is arranged instead of a hollow stirring cone and is mounted on the shaft 2 and rotates therewith. Also in this case both the acid and the crude phosphate are fed on to the surface of the liquid in the vessel, preferably from a large number of points, as indicated by the arrows 5 and 6 respectively. The reaction mix leaves the vessel at 7.

Figure 6:
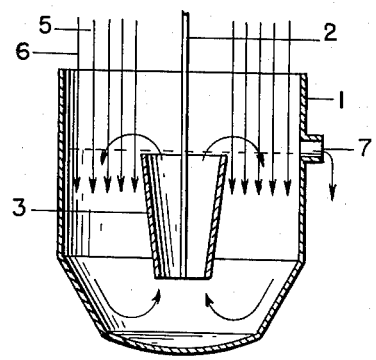
Figs. 6 and 7 show structures similar to Fig. 4.

The apparatus illustrated in Fig. 6 corresponds substantially to that shown in Fig. 5, but with the difference that the crude phosphate and the acid are here introduced below the surface of the liquid in the vessel. To indicate this, the arrows 5 and 6 extend deeper in Fig. 6 than in Figs. 4 and 5.

Figure 7:
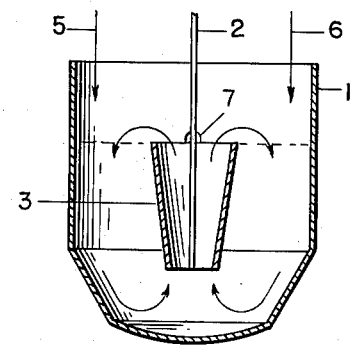

Fig. 7 shows a container of the type illustrated in Fig. 4 provided with a hollow stirring cone, but in this case the crude phosphate is fed not below the surface of the liquid but onto it, but is not distributed over the surface but takes place at the point indicated by the arrow 6 which is located as far as possible from the point 5 where the acid is introduced into the vessel.

Figure 8:
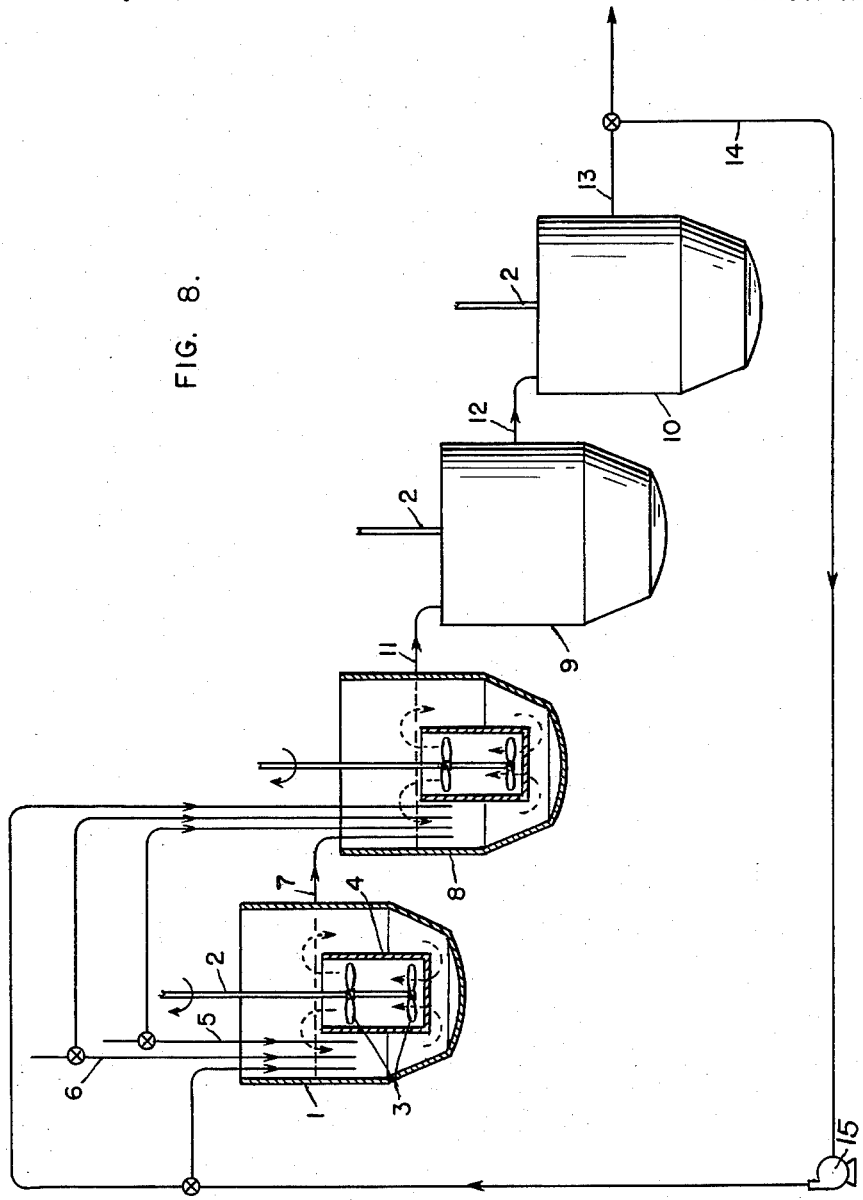
Fig. 8 shows the use of such unit vessels in a conventional series.

Fig. 8 is a schematic diagram of the series of four mixing vessels 1, 8, 9 and 10 interconnected by piping 7, 11 and 12 so that the reaction mixture flows continuously through the series in sequence. The final reaction product leaves the last mixing vessel by the pipe 13. A part of the final reaction product is returned to the first two mixing vessels through pipe 14, the pump 15. The crude phosphate is fed through the pipe 6 and the acid through pipe 5.

The diagram represents known practice in reacting phosphate rock in a sequence of steps and indicates the manner in which the improved agitation is applied.

What is claimed is:

1. A process of dissolving uncalcined crude phosphate, comprising mixing the crude phosphate with strong inorganic acid selected from the group consisting of nitric acid, sulphuric acid, phosphoric acid and mixtures thereof in one of the first two vessels of a series of interconnected mixing vessels through which the reaction mixture flows successively, conducting a portion of the reaction product back from the last vessel of the series to one of the first two vessels of the series and in maintaining the reaction mixture in at least one of the first two vessels of the series a continuous circulation from the bottom to the top in the central zone of the vessel and from the top to the bottom in the zone adjacent the wall of the vessel beside the rotation of the reaction mixture around the center of the mixing vessel.

2. A process of dissolving crude phosphate, in particular uncalcined crude phosphate, comprising mixing the crude phosphate with strong inorganic acid selected from the group consisting of nitric acid, sulphuric acid, phosphoric acid and mixtures thereof in one of the first two vessels of a series of interconnected mixing vessels through which the reaction mixture flows successively, conducting a portion of the reaction product back from the last vessel of the series to one of the first two vessels of the series, in maintaining in the reaction mixture in at least one of the first two vessels of the series a continuous circulation from the bottom to the top in the central zone of the vessel and from the top to the bottom in the zone adjacent the wall of the vessel and beside the rotation of the reaction mixture around the center of the mixing vessel and in feeding upon the surface of the reaction mixture in at least one of the first two vessels of the series, the starting materials, namely the crude phosphate, and the fresh acid, and the portion of the reaction product which is conducted back from the last vessel of the series.

3. A process as set forth in claim 2, wherein the crude phosphate and the fresh acid with the portion of the reaction product which is conducted back from the last vessel of the series are introduced into at least one of the first two vessels of each series at two points situated as far as possible apart upon the surface of the reaction mixture in said vessel.

4. A process of dissolving uncalcined crude phosphate, comprising mixing the crude phosphate with strong inorganic acid selected from the group consisting of nitric acid, phosphoric acid and mixtures thereof in one of the first two vessels of a series of interconnected mixing vessels through which the reaction mixture flows successively, conducting a portion of the reaction product back from the last vessel of the series to one of the first two vessels of the series, maintaining in the reaction mixture in at least one of the first two vessels of the series a continuous circulation from the bottom to the top in the central zone of the vessel and from the top to the bottom in the zone adjacent the wall of the vessel beside the rotation of the reaction mixture around the center of this mixing vessel and in feeding upon the surface of the reaction mixture in at least one of the first two vessels of the series, the starting materials, namely crude phosphate and the fresh acid, and the portion of the reaction product which is conducted back from one of the last vessels of the series.

5. A process as set forth in claim 4, wherein the starting crude phosphate and the fresh acid with the portion of the reaction product which is conducted back from one of the last vessels of the series are introduced into at least one of the first two vessels of the series at two points situated as far as possible apart below the surface of the reaction mixture in said vessel.

6. Apparatus for dissolving uncalcined crude phosphate, with strong inorganic acid selected from the group consisting of nitric acid, sulphuric acid, phosphoric acid and mixtures thereof, comprising a combination of a plurality of mixing vessels in series, the lower third of the wall of each vessel tapering conically downwards and towards the centre of the vessel, the bottom of each vessel being a shallow depression; conduits interconnecting said vessels in such a manner that the reaction mixture flows through the vessels of the series successively, return conduits interconnecting said vessels and extending from the last vessel of the series back to at least one of the first two vessels of the series for conducting a portion of the reaction product to the vessels at the beginning of the series, means in at least one of the first two vessels of the series for maintaining the reaction mixture in this vessel in continuous circulation from the bottom to the top in the central zone of the vessel and from the top to the bottom in the zone adjacent the wall thereof beside the rotation of the reaction mixture around the centre of the mixing vessel.

7. Apparatus for dissolving uncalcined crude phosphate with strong inorganic acid selected from the group consisting of nitric acid, sulphuric acid, phosphoric acid and mixtures thereof, comprising a combination of a plurality of mixing vessels arranged in series, the lower third of the wall of each vessel tapering conically downwards and towards the centre of the vessel and the bottom of each vessel being a shallow depression, conduits interconnecting said vessels in such a manner that the reaction mixture flows through the vessels of the series one by one, return conduits interconnecting said vessels and extending from the last vessel of each series back to at least one of the first two vessels of the series for conducting a portion of the reaction product to the vessels at the beginning of the series, means in at least one of the first two vessels of the series for maintaining the reaction mixture in this vessel in continuous circulation from the bottom to the top in the central zone of the vessel and from the top to the bottom in the zone adjacent the wall of this vessel beside the rotation of the reaction mixture around the center of this mixing vessel and for separating the upward flow of the reaction mixture from the downwards flow thereof.

8. Apparatus as set forth in claim 7, wherein the means for maintaining the solution in continuous circulation in one of the first two vessels of the series consists of a stirring hollow conical tube arranged vertically in the center of the vessel, dipping below the surface of the solution contained therein.

9. Apparatus as set forth in claim 7, wherein the means for maintaining the solution in one of the first two vessels of the series in continuous circulation consists of a rotary hollow conical spray tube arranged vertically in the center of the vessel partly submerged in the solution and provided with discharge apertures on its upper edge, which rises above the surface of the liquid in this mixing vessel.

10. Apparatus for dissolving uncalcined crude phosphate, with strong inorganic acid selected from the group consisting of nitric acid, sulphuric acid, phosphoric acid and mixtures thereof comprising a combination of a plurality of mixing vessels arranged in series, the lower third of the wall of each vessel tapering conically downwards and towards the center of the vessel and the bottom of each vessel being a shallow depression, conduits interconnecting said vessels in such a manner that the reaction mixture flows through the vessels of the series successively; return conduits interconnecting said vessels and extending from at least one of the last vessels of the series for conducting a portion of the reaction mixture to the vessels at the beginning of the series, means in at least one of the first two vessels of the series for maintaining the solution in this vessel in continuous circulation from the bottom to the top in the central zone of the vessel and from the top to the bottom in the zone adjacent the wall of the vessel and for separating the upward flow of the reaction mixture from the downward flow, consisting of a guide tube arranged vertically in the center of the vessel and submerged in the solution therein, and of a stirring propeller arranged in said guide tube and rotating in such direction so as to cause an upward flow of the solution through the guide tube.

References Cited in the file of this patent

UNITED STATES PATENTS

| | | |
|---|---|---|
| 1,404,709 | Albright | Jan. 24, 1922 |
| 1,986,293 | Shoeld | Jan. 1, 1935 |
| 2,232,115 | Koppers | Feb. 18, 1941 |
| 2,438,204 | Castner | Mar. 23, 1948 |
| 2,635,955 | Constant | Apr. 21, 1953 |
| 2,656,266 | Calmeyer | Oct. 20, 1953 |
| 2,698,219 | Martin | Dec. 28, 1954 |
| 2,701,193 | Heudier et al. | Feb. 1, 1955 |
| 2,707,676 | Picot et al. | May 3, 1955 |
| 2,770,539 | Martenet | Nov. 13, 1956 |
| 2,798,801 | Keffer et al. | July 9, 1957 |